W. J. DREY.

MACHINE FOR FORMING SHOES.

APPLICATION FILED JAN. 2, 1917.

Reissued Sept. 11, 1917.

14,351.

4 SHEETS—SHEET 1.

INVENTOR.

Wilfred J. Drey

W. J. DREY.

MACHINE FOR FORMING SHOES.

APPLICATION FILED JAN. 2, 1917.

Reissued Sept. 11, 1917.

14,351.

4 SHEETS—SHEET 2.

INVENTOR

Wilfred J. Drey

W. J. DREY.

MACHINE FOR FORMING SHOES.

APPLICATION FILED JAN. 2, 1917.

Reissued Sept. 11, 1917.

14,351.

4 SHEETS—SHEET 3.

INVENTOR.

Wilfred J. Drey

W. J. DREY.

MACHINE FOR FORMING SHOES.

APPLICATION FILED JAN. 2, 1917.

Reissued Sept. 11, 1917.

14,351.

4 SHEETS—SHEET 4.

INVENTOR.

Wilfred J. Drey

UNITED STATES PATENT OFFICE.

WILFRED JOHN DREY, OF CARLISLE, PENNSYLVANIA, ASSIGNOR, BY DIRECT AND MESNE ASSIGNMENTS, TO UNITED SHOE MACHINERY COMPANY, OF PATERSON, NEW JERSEY, A CORPORATION OF NEW JERSEY.

MACHINE FOR FORMING SHOES.

14,351. Specification of Reissued Letters Patent. Reissued Sept. 11, 1917.

Original No. 1,167,277, dated January 4, 1916, Serial No. 16,173, filed March 22, 1915. Application for reissue filed January 2, 1917. Serial No. 140,299.

*To all whom it may concern:*

Be it known that I, WILFRED J. DREY, a citizen of the United States, residing at Carlisle, in the county of Cumberland and State of Pennsylvania, have invented new and useful Improvements in Machines for Forming Shoes, of which the following is a specification, like reference characters on the drawings indicating like parts in the several figures.

This invention relates to shoe forming machinery, and has for an object to provide a machine for forming, from a single piece or sheet of material, a shoe part comprising the sole and side portions of a shoe, such shoe parts being of particular utility in the manufacture of a type of shoe herein termed a sandal, this term being used herein in a sense inclusive of all such shoes as comprise integral sole and side portions including what are commonly known as moccasins.

With the above and other objects in view, the invention provides, as an important feature, a novel construction and organization of mechanism for operating upon a blank to mold the bottom or sole portion of a shoe and to turn up the sides of the blank around the sole portion to form the sides of the shoe. The illustrative machine comprises a pair of dies for molding the sole portion of the blank between them, a table provided with an opening therein, and means for effecting relative movement of the dies and the table to cause the sides of the blank to be turned up about one of the dies by engagement of the blank with the table at the edges of the opening.

A further feature of the invention resides in a novel construction and arrangement of mechanism for turning up the margin of a blank around the sole portion to form the sides of a shoe and for subsequently molding the upturned sides into shoe shape. In the machine shown the margin of the blank is first turned up about the sides of a die which has the shape of a last and is then moved into position to be operated upon by molding means which engages the outer surface of the upturned margin and presses it against the die to mold it into the shape desired for the sides of the shoe.

The above and other features of the invention, including certain details of construction and combinations of parts, will now be described with reference to the accompanying drawings and pointed out in the claims.

Figure 4:
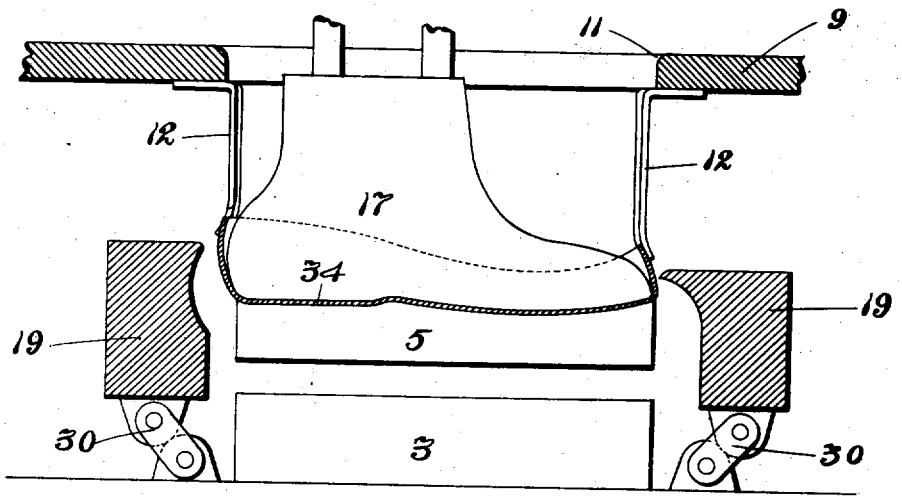
Figure 5:
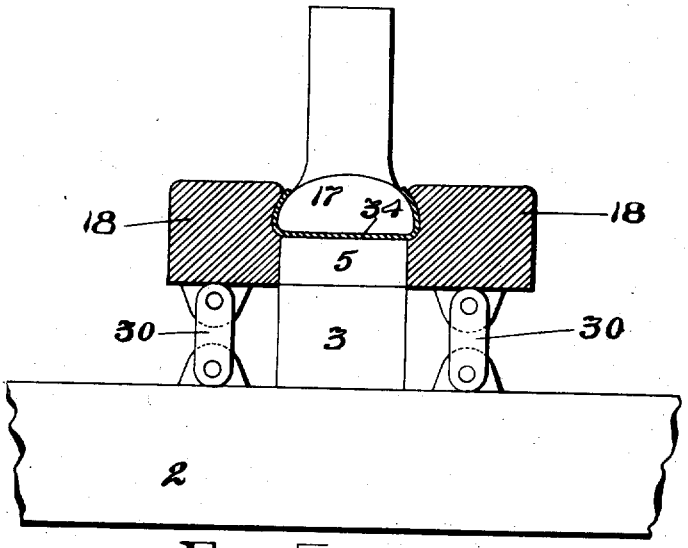
Figure 6:
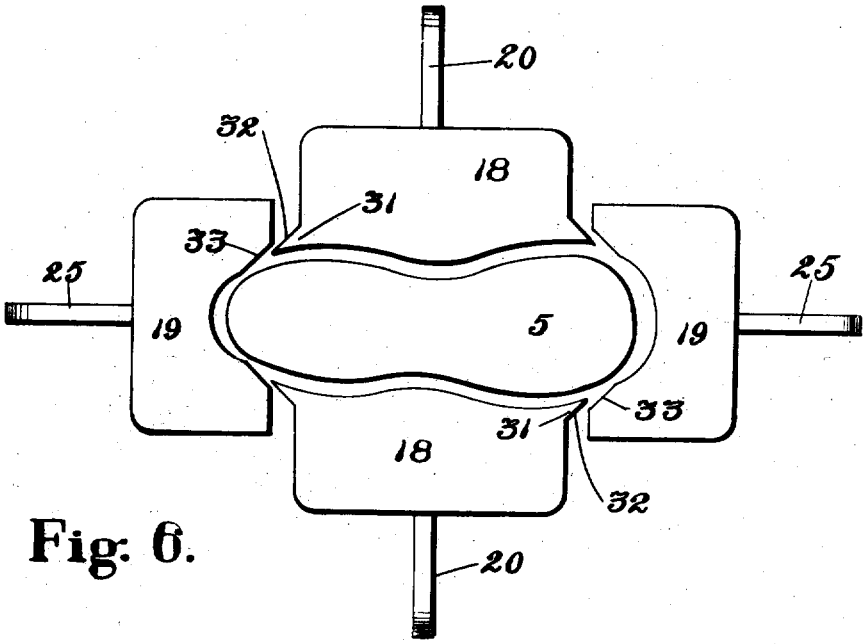
Figure 7:
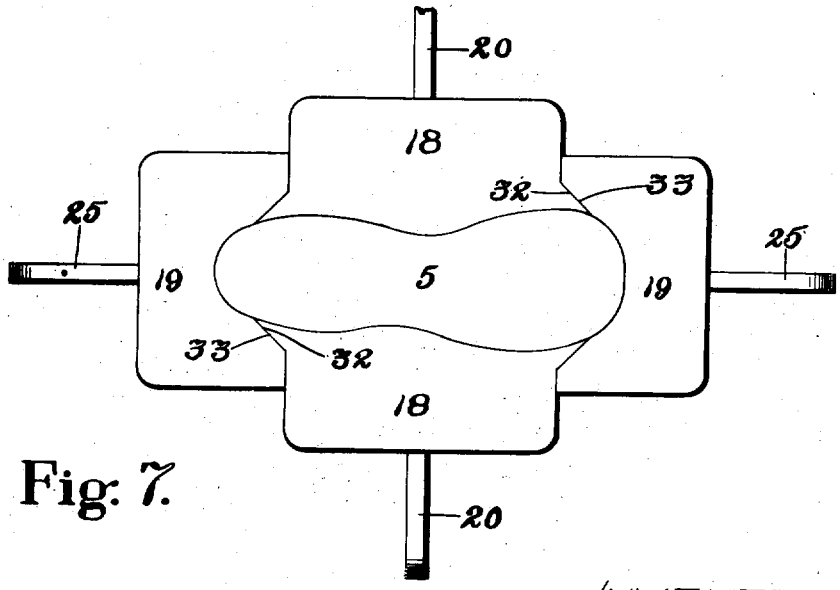

Fig. 4 is a detailed view showing the stage in the operation of the machine where the sheet of material has been clamped between the upper and lower dies and moved downward through the opening in the table, whereby the marginal portion of the sheet is turned up around the upper die which is in the form of a shoe last, the dies having nearly reached their lowest position within the side and end forming blocks;

Fig. 5 is a detailed view showing the last stage in the formation of a sandal when the side and end forming blocks are moved inward to press the marginal portion of the blank against the sides of the upper die;

Fig. 6 is a detailed plan view of the side and end forming blocks in their open or expanded position; and Fig. 7 is a similar view, showing said side and end forming blocks in their closed or contracted position.

A suitable frame 1 is provided with a cross bar or member 2 on which is mounted a bed plate 3 through which extend a pair of vertically disposed and longitudinally movable rods 4 supporting at their upper ends the lower die 5. The lower ends of the rods 4 are provided with cam rolls 6 fitting the grooves of cams 7 mounted on a driving shaft 8.

Figure 1:
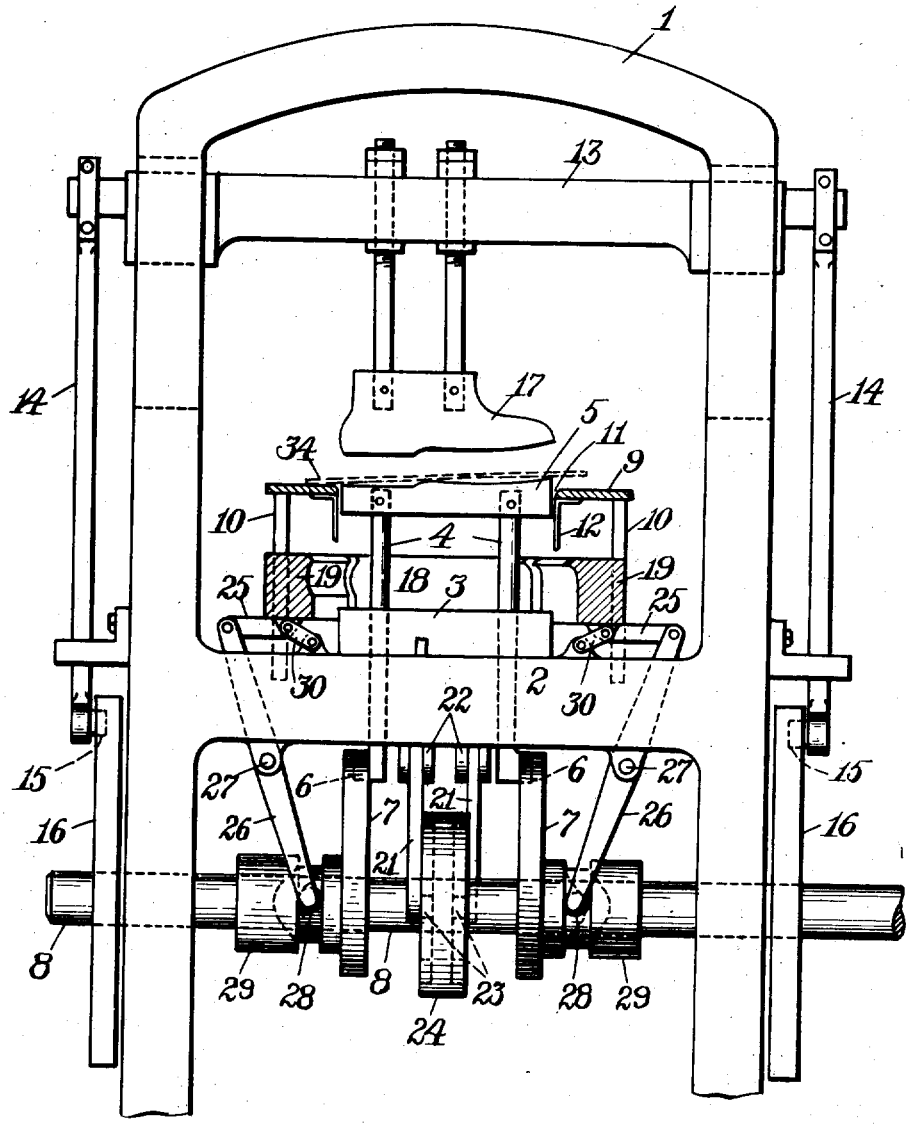
Figure 1 is a front elevation of a machine constructed substantially in accordance with the present invention, the parts being shown in position for beginning the operation of forming a sandal from a sheet of material, the latter being indicated in dotted lines between the upper and lower dies.
Figure 2:
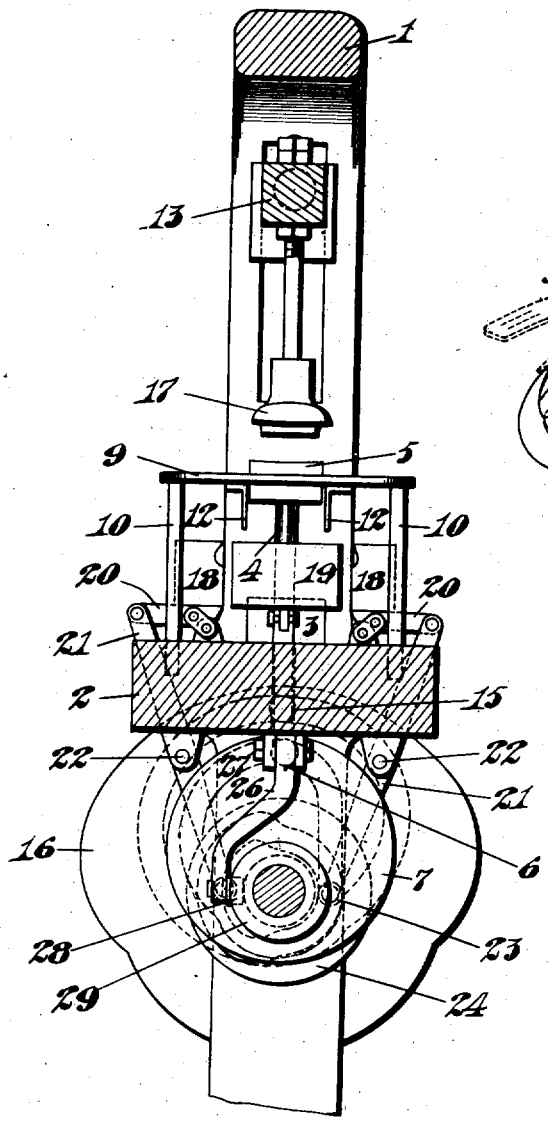
Fig. 2 is a side view of the machine, the frame being shown in section.

About on a level with the uppermost position of the lower die 5, which position is illustrated in Figs. 1 and 2, there is mounted a table 9 supported on legs 10 extending upward from the cross bar 2 of the frame. Said table 9 has an opening 11 therein, which opening conforms closely to the shape of the lower die 5 the contour of which corresponds to the outline of the sole of the sandal to be made. Brackets or pins 12 are secured to the under surface of the table 9 at intervals around the opening 11, the inner faces of the depending portions of said brackets or pins being flush with the edge of the opening. These brackets or pins extend downward near to the level of the tops of the side and end forming blocks which will be hereinafter described, the function of said brackets or pins being to hold the upturned marginal portion of the blank around the upper die until said blank passes between said side and end forming blocks.

A cross head or beam 13 is mounted to be reciprocated vertically on the upper portion of the frame 1 by means of rods 14 having cam rolls 15 on their lower ends fitted in the grooves of the cams 16 on the shaft 8. Said cross head 13 carries the upper die 17 which is made in the form of a shoe last and of a size corresponding to the lower die 5 and to the opening 11 in the table 9. As illustrated in Figs. 1 and 2, the upper die 17 may be raised above or spaced from the lower die 5 when said lower die is substantially level with the table 9.

The side forming blocks 18 and end forming blocks 19 are mounted around the bed plate 3 and are capable of being moved simultaneously inward for contracting them around the dies as shown in Fig. 5, and outward for expanding them so that they will be spaced from the dies all around, as illustrated in Fig. 6. This contracting and expanding movement of the forming blocks is effected by means of levers connected to the blocks and controlled by cams on the driving shaft 8. The side blocks 18 are connected by links 20 to levers 21 intermediately pivoted at 22 below the cross bar 2 of the frame and carrying cam rolls 23 on their lower ends engaging grooves in the opposite faces of a cam 24 on the shaft 8, see Fig. 2. The end blocks are connected by links 25 to levers 26 intermediately pivoted at 27 below the cross bar 2 of the frame and carrying cam rolls 28 on their lower ends engaging the grooves in cams 29 on the driving shaft 8. The side and end forming blocks may be mounted on links 30 or mounted to be moved horizontally by any other suitable means. The inner faces of said blocks are shaped to conform to the outline of the dies, and the side blocks 18 are preferably provided at the ends of their inner faces with overlapping extensions 31 having beveled outer faces 32 adapted to interlock with correspondingly recessed portions 33 in the end portions of the end blocks 19, the object of this construction being to prevent parts of the upturned margin of the blank being caught and pinched between the blocks when they are contracted.

The initial position of the machine is illustrated in Figs. 1 and 2, the contractible forming blocks being expanded, the lower die 5 being substantially level with the table 9, and the upper die 17 being spaced above the lower die. A sheet of material or blank 34, indicated in dotted lines in Fig. 1 and in solid lines in Figs. 4 and 5, is placed on the lower die as the first step in forming a sandal. It will be understood, of course, that the blank is of the proper shape to form the sole and sides of the sandal. The material used is preferably paper, compressed pulp, or other composition commonly known as artificial leather, although for an article of better quality leather may be used. In any case, the material should be moistened or put "in temper" before it is placed in the machine in order to secure the best results.

Figure 3:
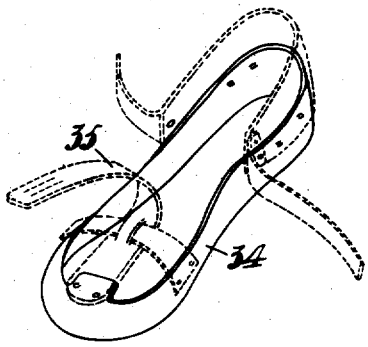
Fig. 3 is a perspective view of the finished sandal, the fastening straps, which may be riveted thereto, being shown in dotted lines.

When the driving shaft 8 starts to rotate, the cams 16 operate first to lower the upper die 17 toward the lower die 5, thus clamping the blank firmly between said dies and forming the sole of the sandal in conformity with the opposed faces of said dies. As soon as this is accomplished, the lower die 5 begins to move downward with the upper die, by the action of the cams 7. As the dies move downward through the opening 11 in the table 9, the marginal portion of the blank will be turned up around the side faces of the upper die by the edge of said opening 11. As the blank is carried still farther down by the dies, the brackets or fingers 12 retain the upturned marginal portion of the blank in position until said dies reach their lowest position, with the lower die resting upon the base plate 3, as shown in Fig. 5, and the upturned marginal portion of the blank arranged between the upper die 17 and the forming blocks 18 and 19. The arrangement of the grooves in the cams 7 and 16 is such that the dies will remain stationary in their lowest position while the cams 24 and 29 come into play to contract or close the side and end forming blocks 18, 19 against the die 17 to mold the material. In this operation the forming blocks and lower die 5 constitute an outer or female mold and the upper die 17 an inner or male mold for giving the final shape to the sole and side portions of the shoe. Continued action of the cams 24 and 29 then withdraws or opens the blocks 18 and 19 and the cams 7 and 16 then operate again to raise the dies together until the lower die reaches its uppermost position illustrated in Figs. 1 and 2, after which the cams 16 continue to raise the upper die until it is spaced above the lower die as at the start. The formed shoe part may then be removed from the upper die and another sheet or blank placed between the dies for a repetition of the operations just described. To complete the shoe part thus formed it is only necessary to attach fastening straps 35, indicated in dotted lines in Fig. 3, which may be done very quickly by the use of suitable fastening means such as rivets, or the shoe part may be completed as a moccasin by similarly attaching a toe piece.

When the blank is first clamped between the dies the portion of the blank forming the sole of the sandal is by the apparatus thus described subjected to an extremely high pressure while the dies are temporarily held stationary in the process of forming the sole portion of the sandal thus compressing the material forming the sole part, after which the dies with the material therebetween start on their downward movement, as above described.

Having thus described my invention, what I claim as new and desire to secure by Letters Patent of the United States is:

1. In a machine of the character described, the combination with a pair of dies for clamping a blank between them to form the sole of a sandal, of a table having an opening through which the dies are movable for turning up the marginal portion of the blank to form the sides of the sandal.

2. In a machine of the character described, the combination with a pair of dies for clamping a blank between them to form the sole of a sandal, of a table having an opening through which the dies are movable for turning up the marginal portion of the blank to form the sides of the sandal, and means for compressing said upturned marginal portion of the blank around one of the dies for shaping the sides of the sandal.

3. In a machine of the character described, the combination with a pair of dies for clamping a blank between them to form the sole of a sandal, of means for turning up the marginal portion of the blank to form the sides of the sandal, means to which said blank is moved spaced below said upturning means for pressing said upturned marginal portion of the blank around one of the dies to shape the sides of the sandal, and means for holding the upturned marginal portion of the blank in position as it is moved from the upturning means to the pressing means.

4. In a machine of the character described, the combination with a pair of dies for clamping a blank between them to form the sole of a sandal, of means for turning up the marginal portion of the blank to form the sides of the sandal, means to which said blank is moved spaced below said upturning means for pressing said upturned marginal portion of the blank around one of the dies to shape the sides of the sandal, and a series of brackets or pins extending below the upturning means adapted to hold the upturned marginal portion of the blank in position as it is moved from the upturning means to the pressing means.

5. In a machine of the character described, the combination, with a pair of dies for clamping a blank between them to form the sole of a sandal, of a table having an opening through which the dies are movable for turning up the marginal portion of the blank to form the sides of the sandal, means spaced below the table for pressing said upturned marginal portion of the blank around one of the dies to shape the sides of the sandal, and depending brackets attached to the table and arranged flush with the opening therein for holding the upturned marginal portion of the blank in position as it passes from the table to the pressing means.

6. In a machine of the character described, the combination, with a movable upper die shaped like a shoe last, of a movable lower die having its upper surface shaped to conform to the bottom of the upper die and conforming in outline to the upper die, a table having an opening therein through which the dies are movable for turning up the marginal portion of a blank clamped between them for forming the sides of a sandal, and means for moving the upper die independently of the lower die for spacing them apart to permit the introduction of a blank between them, and means for moving said dies together through the opening of the table.

7. In a machine of the character described, the combination, with a vertically movable upper die shaped like a shoe last, of a vertically movable lower die having its upper surface shaped to conform to the bottom of the upper die and having its outline conforming to that of the upper die, a table having an opening therein through which the dies are movable for turning up the marginal portion of a blank clamped between them for forming the sides of a sandal, means for moving the upper die independently of the lower die for spacing them apart to permit the introduction of a blank between them, and means to move the dies together through the opening in the table, and horizontally movable blocks mounted below the table and adapted to be simultaneously contracted around the dies to press the upturned marginal portion of the blank against one of the dies for shaping the sides of the sandals.

8. In a machine of the character described, the combination with a pair of dies for clamping a blank between them to form the sole of a sandal, of means for turning up the marginal portion of the blank to form the sides of the sandal, and means arranged to receive the blank from the upturning means and to press said upturned marginal portion of the blank around one of the dies to shape the sides of the sandal.

9. In a machine of the character described, the combination of a die beneath which a blank may be placed, means for turning up the marginal portion of the blank about the die to form the sides of a sandal, and means arranged to receive the blank and die from the upturning means and to press the upturned marginal portion of the blank against the die to shape the sides of the sandal.

10. In a machine of the character described, the combination of a die beneath which a blank may be placed, means for turning up the marginal portion of the blank around the die to form the sides of a shoe, pressing means arranged to receive the die and blank from the upturning means and to form the upturned marginal portion against the sides of the die, and means cooperating with the bottom of the die for forming the central portion of the blank as the sole of the shoe.

11. In a machine of the character described, the combination of a pair of dies between which a blank may be placed, means through which the dies are movable to turn up the marginal portion of the blank about one of the dies, means to which the blank is moved for compressing the marginal portion against one of the dies to form the sides of a shoe, and means for moving relatively the dies to form the central portion of the blank as the sole of the shoe.

12. In a machine of the character described, the combination with a die, of a table having an opening to receive the die, means for moving relatively the die and table to turn up the marginal portion of a blank placed between the die and table about the side portions of the die to form the sides of a shoe part, a mold having internally the contour of the sides and bottom of a shoe arranged to receive the die and blank upturned about the die, and means for moving relatively the die and mold to effect molding of the side and bottom portions of the blank to form the sides and bottom of the shoe.

13. In a machine of the character described, the combination of a table having an opening, an upper die movable through the opening, means for moving the upper die through the opening to turn the marginal portion of a blank placed upon the table up around the side faces of the die, a mold having internally the contour of the sides of a shoe and comprising movable forming blocks arranged to receive the blank as it passes through the table with its marginal portion upturned, and means for closing the forming blocks toward the upper die and operating to press the marginal portion against the upper die to form the side portions of the shoe.

14. In a machine of the character described, the combination of a die having the shape of a shoe last, a table adapted to receive a flat blank and having an opening through which the die is movable, means for moving the die through the opening in the table to turn up the marginal portion of the blank about the die, compressing means arranged to receive the die and blank with the upturned marginal portion as it passes from the table, and means for operating the compressing means to shape the marginal portion of the blank against the die to form the sides of a shoe.

15. In a machine of the character described, the combination of a die, a table having an opening through which the die may be moved, means for operating the die to force the blank through the table to give the blank a shape approximating that of the sole and side portions of a shoe, and a mold arranged to close on the die after it passes through the table to complete the molding of the side portions of the shoe.

16. In a shoe forming machine, a table, a die, means for moving relatively the die and table whereby a flat blank placed on the table is engaged at its central portion by the die and the marginal portions are turned up about the die, a mold arranged to receive the blank and the die, and means for effecting relative movement of the mold and die to mold the central portion of the blank to form the sole of the shoe and to mold the marginal portions to form the side portions of the shoe.

17. In a machine for molding the bottom and side portions of a shoe from a flat blank in a single operation, an inside die, means for folding up the blank about the sides of the die, a mold, means for moving the inside die and folded up blank into the mold, and means for effecting relative movement between the mold and the die to mold the blank into the shape of the sole and side portions of the shoe.

18. In a machine of the character described, the combination with a die, of a table having an opening to receive the die, means for relatively moving the die and the table to turn up the marginal portion of a blank placed between the die and the table about the side portions of the die, and molding means for receiving the blank thus formed and molding the sides of the blank into the shape of a shoe.

In testimony whereof I have signed my name to this specification.

WILFRED JOHN DREY.

Copies of this patent may be obtained for five cents each, by addressing the "Commissioner of Patents, Washington, D. C."